(12) United States Patent
Xuan

(10) Patent No.: US 10,931,716 B2
(45) Date of Patent: Feb. 23, 2021

(54) POLICY STRENGTH OF MANAGED DEVICES

(71) Applicant: VMware, Inc., Palo Alto, CA (US)

(72) Inventor: Chaoting Xuan, Duluth, GA (US)

(73) Assignee: VMware, Inc., Palo Alto, CA (US)

( * ) Notice: Subject to any disclaimer, the term of this patent is extended or adjusted under 35 U.S.C. 154(b) by 398 days.

(21) Appl. No.: 15/893,025

(22) Filed: Feb. 9, 2018

(65) Prior Publication Data

US 2019/0253455 A1 Aug. 15, 2019

(51) Int. Cl.
| | | |
|---|---|---|
| *G06F 17/00* | (2019.01) | |
| *H04L 29/06* | (2006.01) | |
| *H04L 12/24* | (2006.01) | |

(52) U.S. Cl.
CPC .......... *H04L 63/20* (2013.01); *H04L 41/0893* (2013.01)

(58) Field of Classification Search
CPC ... H04L 41/0893; H04L 63/20; H04L 41/046; H04L 63/104; H04L 63/105; H04L 63/10; G06F 21/577; G06F 21/57
USPC ......................................................... 709/223
See application file for complete search history.

(56) References Cited

U.S. PATENT DOCUMENTS

| | | | | |
|---|---|---|---|---|
| 2006/0259604 | A1* | 11/2006 | Kotchavi | H04L 41/082 709/223 |
| 2010/0162036 | A1* | 6/2010 | Linden | G06F 11/181 714/4.11 |
| 2014/0195927 | A1* | 7/2014 | DeWeese | H04L 63/083 715/750 |
| 2017/0288965 | A1* | 10/2017 | Cebere | H04L 41/046 |
| 2017/0317908 | A1* | 11/2017 | Jose | H04L 41/0893 |
| 2018/0241731 | A1* | 8/2018 | Guo | G06F 21/629 |
| 2019/0018968 | A1* | 1/2019 | Ronca | G06F 11/3452 |
| 2019/0068627 | A1* | 2/2019 | Thampy | H04L 63/1425 |
| 2019/0098037 | A1* | 3/2019 | Shenoy, Jr. | H04L 63/105 |
| 2019/0158465 | A1* | 5/2019 | Ahuja | H04L 63/20 |
| 2019/0230130 | A1* | 7/2019 | Beckman | G06F 8/65 |
| 2019/0253455 | A1* | 8/2019 | Xuan | H04L 63/20 |

* cited by examiner

*Primary Examiner* — Maung T Lwin
*Assistant Examiner* — Lizbeth Torres-Diaz
(74) *Attorney, Agent, or Firm* — Thomas | Horstemeyer LLP

(57) ABSTRACT

Various examples for identifying clusters of instances of managed devices within a management service are described. Clusters are identified based upon a policy strength score of the respective instances. The policy strength scores can be generated based upon the security settings of the instance within the management service.

20 Claims, 4 Drawing Sheets

POLICY STRENGTH OF MANAGED DEVICES

BACKGROUND

Mobile devices, such as smartphones, tablet devices, personal computing devices, or other devices, are often used in various enterprise, retail, and business settings. These devices are often purchased enrolled with a management service that is administered by an administrator on behalf of an enterprise. Security is an important consideration for administrators of a population of devices. Enterprise mobility management (EMM) services can allow an administrator to manage various aspects of devices that are enrolled with the management service.

Administrators may wish to obtain guidance or suggestions as to how a particular instance of managed devices is configured from a security perspective. However, the administrator may not have the ability to know how his or her peers at similar organizations are configuring an instance of managed devices within a management service. The reason for this is that administrators of other organizations' instances might be unwilling to expense their specific security settings.

Aggregated information about the security settings of a particular can be helpful in this regard. However, a mere aggregation of the security settings does not provide specific guidance to an administrator as to how the security settings of the instance can be brought in line with those of peer organizations.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Aspects of the present disclosure relate to identifying clusters of instances of managed devices within a management service. The clusters are identified based upon a policy strength score that characterizes how strong the security parameters of a particular instance are configured. The clusters are also identified based upon a categorization of an instance of managed devices. A categorization can include an industry vertical, an organization type, an organization size, or a geographic parameter. In context of this disclosure, a management service can comprise a hosted service or software as a service (SaaS) environment that manages enrolled devices on behalf of various organizations and customers.

The management service can identify clusters of organizations according to a policy strength score and also provide recommendations to an administrator of a particular organization as to how the security settings associated with the enterprise can be modified to improve the policy strength score or how the settings can be modified to bring them in line with other organizations that are in the same category. The management service, in some cases, can also proactively modify the security settings of the organization to bring them in line with the other organizations that are in the same category. For example, if a particular customer or organization within the management service is categorized as a university, the management service can determine whether the organization's security settings are in line with one or more clusters of other university customers and inform the administrator if the organization's policy strength score indicates that its settings indicate that it is not clustered with other universities.

In this way, an administrator can determine whether the practices of the organization in administering the management service on behalf of the organization are using practices and security settings that are similar to other comparable organizations. Therefore, examples of the disclosure involve systems and methods that can generate a policy strength score that is based upon the various security settings within a management service for a particular organization, generate clusters of organizations within various categories, and determine whether a given organization or enterprise falls within or outside of one or more clusters within the categories. cause an enrollment barcode to be generated by a barcode service that, when scanned by a staging client on a client device, can cause the device to automatically enroll itself with a management service and install other applications and data on the device as directed by the enrollment barcode.

Figure 1:
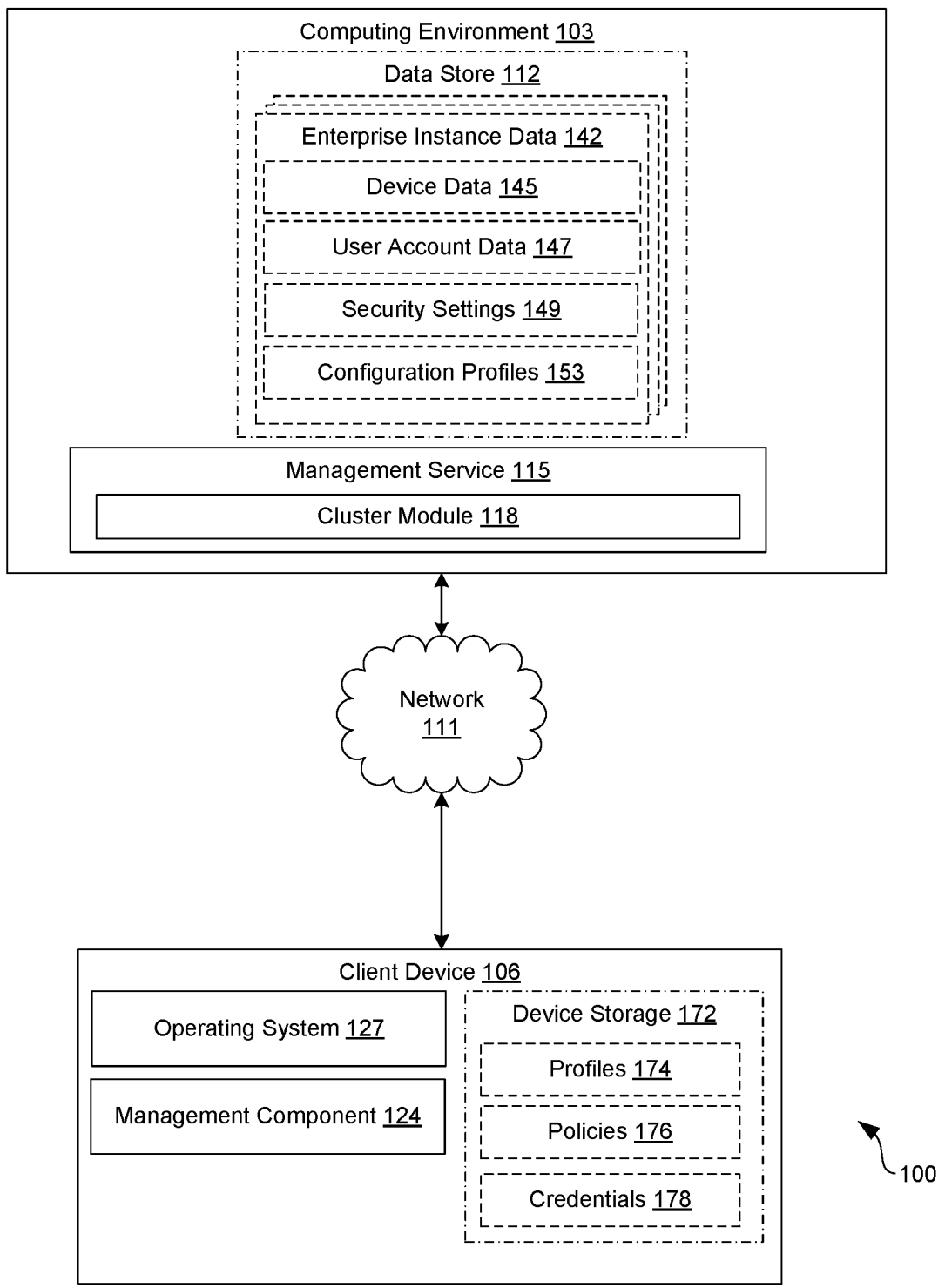
FIG. 1 is a drawing of a networked environment according to examples of the disclosure.

With reference to FIG. 1, shown is an example of a networked environment 100. The networked environment 100 can include a computing environment 103 and one or more client devices 106 in communication with one another over a network 111. The network 111 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with a client device 106 remotely over the network 111, the computing environment 103 can be described as a "remote" computing environment 103.

The computing environment 103 can include a data store 112. The data store 112 can include memory of the computing environment 103, mass storage resources of the computing environment 103, a database or data storage service that is accessible to the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115 as well as other applications, services, processes, systems, engines, or functionality not discussed in detail herein. The management service 115 can be executed to oversee the operation of client devices 106 enrolled with the management service 115. In some embodiments, the management service 115 can be operated as a hosted service that various organizations can use to manage their respective devices within their respective organizational accounts. The enterprise, such as one or more companies or other organizations, can utilize the management service 115 to oversee or manage the operation of the client devices 106 of its employees, contractors, customers, or other users having user accounts with the management service 115.

The management service 115 can cause various software components to be installed on a client device 106 that is associated with a particular instance of managed devices within the management service 115. Such software components can include, for example, client applications, resources, libraries, drivers, device configurations, or other similar components that require installation on the client device 106 as specified by an administrator of the management service 115. The management service 115 can further cause policies to be implemented on a client device 106.

Policies can include, for example, restrictions or permissions pertaining to capabilities of a client device 106 such that access to enterprise data is secured on the client device 106. For example, a policy can include providing access to enterprise data when a client device 106 is in a particular location of an office building during a predefined time window (e.g., between 9:00 AM and 5:00 PM). Also, the policy can include denying access to enterprise data when the client device 106 is not in the location of an office building or outside a time of the predefined time window. Policies can further include enabling or disabling certain functions on the client device 106. In one example, a policy can deny camera or audio recording functions when the client device 106 is at a particular location. Other policies can be implemented, as can be appreciated and are described herein. The policies can be configured by the administrator depending on the interests or security policies of the enterprise. The policies can be generated from security settings that are configured by an administrator of a particular instance of managed devices within the management service. The security settings can be configured through a management console user interface that is provided by the management service 115 to administrators. The management console user interface can be a web-based or an app-based user interface that authenticates an administrator and allows the administrator to manage a particular instance of managed devices within the management service 115.

The management service 115 can interact with one or more client applications executed on a client device 106 that is enrolled with the management service 115. In one example, the management service 115 interacts with a management component 124 on the client device 106 to enroll the client device 106 with the management service 115. When enrolled, the management component 124 can be registered as a device administrator of the client device 106, which can provide the management component 124 with sufficient privileges to control the operation of the client device 106. In one example, the management component 124 can be registered as the device administrator through the installation of a management profile at the operating system of the client device 106 that causes an operating system 127 of the client device 106 to designate the management component 124 as the device administrator.

The management service 115 can direct the management component 124 to perform device management functions on the client device 106. For example, the management service 115 can direct the management component 124 to control access to certain software or hardware functions available on the client device 106. As a result, the management service 115 can verify that the configuration and operation of the client device 106 is in conformance with predefined criteria that ensures that enterprise data, or other data, is protected from data loss, unauthorized access, or other harmful events. In this way, the management service 115 can ensure compliance with the various security settings for the particular instance of managed devices with which the client device 106 is associated.

The management service 115 can further provision enterprise data to the client device 106 through the management component 124. In one example, the management service 115 can cause the management component 124 to control use of the client device 106 or provision enterprise data to the client device 106 through use of a command queue provided by the management service 115. In some examples, the management service 115 can store commands in a command queue associated with a particular client device 106 and can command the management component 124 executed by the client device 106 to retrieve the contents of the command queue. In another example, the management component 124 can be configured to retrieve the contents of the command queue on a configured interval, such as every four hours, or upon detection of a certain event, such as detection of an unauthorized application being executed by the client device 106.

In any case, the management component 124 can retrieve the contents of the command queue by checking in with the management service 115 and requesting the contents of the command queue. In one example, the contents of the command queue can include a command that the management component 124 should cause to be executed on the client device 106. In another example, the contents of the command queue can include a resource or client application that the management component 124 should cause to be installed on the client device 106, which the client device 106 may access through a specified uniform resource locator (URL).

The cluster module 118 can identify clusters of instances of managed devices that are managed using the management service 115 based upon a policy strength score that is calculated for the respective instances. In one scenario, a particular instance of managed devices can correspond to a particular organization or enterprise account within the management service. For example, a first instance can correspond to the managed devices of company A, and a second instance can correspond to the managed devices of company B. The two instances can be administered by administrators of the respective companies and can be operated independent of one another using respective user or enterprise accounts within the management service.

Accordingly, the cluster module 118 can generate a policy strength score for the instances of managed devices within the management service 115. In other words, the cluster module 118 can generate a policy strength score for each enterprise account within the management service 115. The policy strength score can represent a relative strength of the security settings that are configured for the particular instance of devices within the management service. The various security settings that can be configured by the administrator within the management service 115 can be assigned weights depending upon the relative importance of a particular security setting compared to other security settings. The possible values of a security setting can be assigned respective numeral values. A policy strength score can then be calculated based upon the assigned weights and the current values for security settings for a given instance of managed devices.

The cluster module 118 can also generate clusters of instances based upon their respective policy strength scores within certain categories that are assigned to instances. For example, an instance of managed devices can be assigned a category by an administrator or by an operator of the management service that specifies an industry, a geographic location, an organization type, an organization size, or a number of devices within the organization. An instance can also be segmented into separate categories based upon a user group or an organization group within a particular population of users or devices.

The clusters can provide an indication that instances within a given category have generally similar security settings because their respective policy strength scores are similar. The clusters generated by the cluster module 118 can also provide an indication of instances within the category that may fall outside of a cluster of other instances in the same category. The cluster module 118 can handle this scenario in at least two ways. In one embodiment, the cluster module 118 can identify one or more instances that are not placed within a cluster and automatically adjust the security settings associated with the identified instance or instances so that they do fall within a cluster. In this scenario, the cluster module 118 can be limited so that it only modifies the security settings so that the policy strength score is increased to move a particular instance into a cluster within its category.

In another embodiment, the cluster module 118 can identify one or more instances that are not placed within a cluster and provide a recommendation to adjust the security settings associated with the identified instance or instances so that they do fall within a cluster. The recommendation can be provided to an administrator of the instance of devices. The recommendation can include an indication that the instance is not within a cluster of other instances within its category and identify one or more security settings that can be modified to modify the policy strength score so that it falls within a cluster.

The data stored in the data store 112 can include, for example, enterprise instance data 142 as well as other data. The management service 115 can maintain information pertaining to management of the client devices 106 enrolled with the management service 115 in the data store 112. In one example, the separate enterprise instance data 142 can be maintained within the data store 112 for the various enterprise instances or customers of the management service 115. In this way, the data associated with the client devices 106 for a particular organization can be segmented from the data of other organizations. The enterprise instance data 142 for a given organization can include information about devices, or device data 145, user account data 147 security settings 149, and configuration profiles 153 that can be utilized to managed devices that are assigned to the particular instance within the management service 115. The enterprise instance data 142 can also include other data that can facilitate management of a particular population of devices that are managed by the management service 115. Additionally, again, the data store 112 can maintain multiple sets of enterprise instance data 142 for the various enterprises or organizations utilizing the services of the management service 115.

Configuration profiles 153 include settings specified by an administrator of the management service 115 for configuration of individual ones of the client devices 106. For instance, the configuration profiles 153 can indicate particular client applications, drivers, or other software components to be installed on the client device 106. Additionally, the configuration profiles 153 can include other settings for the client device 106. Configuration of the client device 106 can be performed by the management component 124, as specified by an applicable configuration profile 153. Through an administrator console, an administrator can create a configuration profile 153 for a client device 106, a group of client devices 106, or a user group. Some client devices 106 within an instance can be configured differently than other client devices 106. In some examples, a configuration profile 153 can include an extensible markup language (XML) document, or other suitable type of file, that can be communicated to the client device 106 or otherwise accessed by the management component 124.

The security settings 149 can specify constraints specified by an administrator for a client device 106 to be in "compliance" with the management service 115. In this sense, a security setting 149 can also be referred to as a compliance rule. The security settings 149 can include criteria specified by the administrator or other criteria. In one example, the management component 124 can configure hardware or software functionality of a client device 106 such that the client device 106 is in conformance with the security settings 149. For instance, an administrator can specify particular types of software updates that are automatically installed on the client devices 106. Additionally, the management component 124 can identify when the client device 106 is not in conformance with a compliance rules, as well as other policies, and can take appropriate remedial actions, such as denying access to enterprise data 130, denying installation of a software update, or other features of the management component 124.

In some examples, the management service 115 communicates with the management component 124 or other application executable on the client device 106 to determine whether vulnerabilities exist on the client device 106 that do not satisfy compliance rules defined by various security settings. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of applications, or other vulnerabilities that might be detectable by the management component 124 or operating system 127.

Security settings 149 represent settings associated with the management service 115 that specify how the enrolled client devices 106 should be managed. Security settings 149 can represent settings that can be incorporated into a policy strength score that the cluster module 118 can calculate for a particular instance. The security settings 149 can also include other configuration parameters that concern setup of the management service 115 that might not incorporated into a policy strength score. For example, a server address might not be incorporated into the policy strength score, but whether SSL encryption is used to communicate with the server might be incorporated into the score. Additionally, the enterprise instance data 142 might include other configuration parameters that specify configuration or setup parameters related to the management service 115 that are not incorporated into the policy strength score.

Examples of security settings 149 can include a network enabled setting, a compromised device setting, a content filtering setting, a data backup setting, a data loss prevention setting, a geofencing setting, a setting defining at least one approved application for opening documents, an offline access setting, an email permission setting, a clipboard permission setting, a camera permission setting, a screenshot permission setting, a user authentication type setting, a passcode type setting, a setting defining a maximum number of failed authentication attempts, a maximum passcode age setting, a setting defining a maximum period between communications with the management service, or a password complexity setting.

A network enabled setting determines whether applications on a client device 106 or population of client devices 106 have the capability to access a network capability of the device. Enabling network access is often essential for some users, but network access can also create an attack vector for attackers, thereby potentially opening security risks to the enterprise.

A compromised device setting determines whether a client device 106 that is rooted, jailbroken, or otherwise compromised is permitted to be enrolled with the management service 115 or permitted to access enterprise resources. If the setting allows compromised devices to access enterprise resources, this can compromise the security of an instance of managed devices or enterprise resources.

A content filtering setting determines whether a configuration profile or compliance rule that limits the content that client devices 106 can access is required for enrolled devices. Limiting the sites or types of content that a client device 106 can access can improve the security of an instance of managed devices or enterprise resources. A data backup setting determines whether data a configuration profile requiring backup of user data from client devices 106 is enabled or required. Required data backup can improve the security of an instance of managed devices or enterprise resources.

An offline access setting, when enabled, allows data that is stored remotely and accessible by the client device to be downloaded and stored locally on the client device so that a particular application can access the data without network access. An example of such a scenario includes files or documents that are accessible through a remote file storage application which the files or documents are stored in a cloud-based location.

A data loss prevention setting can require data loss prevention profiles to be installed on the client device and for data loss prevention settings to be enabled on the management service 115 for the particular instance. Data loss prevention settings can improve the security of an instance of managed devices or enterprise resources by enabling or disabling, for example, a camera, a screenshot capability, or the accessibility of attachments to email messages.

A geofencing setting can require that client device 106 to remain within a particular geographic area in order for the device to remain enrolled with the management service 115. The setting can cause the management service 115 to install a configuration profile on the client device 106 that is enforced by the management component 124. The setting can cause the client device 106 to become unenrolled from the management service 115 or cause certain data to be erased from the client device 106 should the device exit a specified geofence.

A setting defining at least one approved application for opening documents can specify one or more applications that are authorized to access files that are stored on the client device 106. The setting can also define at least one approved application for opening documents that are received in an email client or other messaging application. The setting can be stored in a security policy or configuration profile that is installed on the client device 106 by the management component 124. The management component 124 can enforce the policy by restricting the ability of other application to access files that are stored on or accessed by unapproved applications on the client device 106.

An email permission setting can define whether a user of the client device 106 is permitted to open an email or messaging client or compose an email or message on the client device 106. On certain types of devices or in certain instances of managed devices, the usage of the device might make it unnecessary or unadvisable for the device to access or use email. The email permission setting can also cause the management component 124 to restrict composing email messages with the client device 106 is connected to a certain network or in a certain geographic area.

A clipboard permission setting, camera permission setting, or screenshot permission setting can restrict or enable these respective functionalities in the client device 106. Enabling or disabling of these functionalities can affect the security of the enterprise instance within the management service 115 and also affect the policy strength score of the instance. For example, the clipboard permission setting can cause the management component 124 to enable or disable copying and pasting functionality on an enrolled client device in certain applications or in all applications. The camera permission setting can cause the management component 124 to enable or disable camera functionality on an enrolled client device in certain applications or in all applications. The screenshot permission setting can cause the management component 124 to enable or disable screenshot functionality on an enrolled client device in certain applications or in all applications.

A user authentication type setting can specify a particular form of authentication that is required of users of the enterprise who are authenticating themselves to a directory service or to the management service 115. For example, the authentication type might require two factor authentication, biometric authentication, password authentication, or other forms of authentication that can affect the security of the instance of managed devices.

A passcode type setting can specify the complexity, length, or other aspects of a passcode that is required of users of the enterprise. A more complex required passcode can improve the security of the instance of managed devices. A passcode setting can also include a maximum permitted age of a user passcode or a maximum number of failed attempts that are allowed before a remedial action is taken by the management service 115. A setting defining a maximum period between communications with the management service can improve security of the instance. If the maximum period is exceeded, the management component 124 can perform a remedial action, such as limited or removing access to enterprise resources or erasing data from the client device 106.

Device data 145 can include, for example, data pertaining to an enrollment status for individual ones of the client devices 106. In one example, a client device 106 designated as "enrolled" can be permitted to access the corporate resources of the organization, such as email or other applications, while a client device 106 designated as "not enrolled," having no designation, or "enrolled" but not in compliance with the security settings 148 can be denied access to the enterprise resources. Device data 145 can also include data pertaining to user groups, which can include groups of client devices 106 belonging to an organizational unit, such as information technology (IT), sales, marketing, or other appropriate arrangement for an enterprise or organization. An administrator can specify one or more of the client devices 106 as belonging to a particular user group through an administrator console.

User account data 147 can include information about users who are assigned to a particular device within an instance of managed devices. User account data 147 can include authentication information, user group assignments, user-specific confirmation information, one or more device identifiers associated with the user, user profile data, and other information that the management service 115 can utilize to administer the device within the management service 115.

Configuration profiles 153 can include profiles that are provided to enrolled client devices 106 and installed on the device by the management component 124 on behalf of the management service 115. Configuration profiles 153 can embody security settings 149 that are set by an administrator for an instance of managed devices that are enrolled with the management service 115.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a ruggedized computing device, a barcode scanning device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can execute an operating system 127 configured to execute various software, such as the management component 124 or other applications. The client device 106 can also include drivers, such as device drivers or software drivers, that operate or control hardware devices coupled to the client device 106 or software installed thereon. Further, other applications can include device management applications, enterprise applications, social networking applications, word processors, spreadsheet applications, media viewing applications, or other applications.

The client device 106 can also include device storage 172. The client device 106 can store various data within device storage 172, such as profiles 174, policies 176, and credentials 178. Profiles 174 can include configuration profiles that are installed on the client device 106 by the management component 124 or operating system 127. For example, the operating system 127 or management component 124 can install a management profile that initiates enrollment of the client device 106 with the management service 115 or that embodies a security setting 149.

Policies 176 can include security policies or other types of policies that can be enforced by the management component 124 on behalf of the management service 115 on an enrolled client device 106. Credentials 178 can include encryption keys, certificates, tokens, password, or other types of credentials that can be stored within the device storage 172 for use by the client device 106.

Next, a general description of the operation of the various components of the networked environment 100 is provided. The cluster module 118 of the management service 115 can identify clusters of instances of managed devices that correspond to various enterprise accounts within the management service 115. The clusters can be identified based upon a categorization associated with each of the respective instances. For example, instances in a particular industry, organization size, or geographic location, can be grouped together according to one or more of these categorizations and clusters identified.

The cluster module 118 can generate clusters by calculating a policy strength score for each of the instances of managed devices within a given categorization and running a clustering algorithm to cluster the instances together based upon their respective policy strength scores. The clustering algorithm can be configured to generate a certain number of clusters, or N clusters. For example, the clustering algorithm can be configured to generate three clusters for each industry for which the management service 115 has customers. The three clusters can be ranked by their mean or average policy strength scores to provide a low, middle, and high cluster score. To be placed within a cluster, the clustering algorithm can be configured to cluster instances with a score that are within a certain range or standard deviation of one another. The clusters can provide an indication of industry best practices or at least identify instances within a categorization that are similarly grouped in terms of security settings 149.

The cluster module 118 can also identify instances of managed devices that are not placed within a cluster. The management service 115 can identify how these instances vary from those that are within clusters and provide a recommended action so that the instance can be placed within a cluster. The recommended action can include modification of a security setting 149 that would cause the policy strength score to change so that it falls within a cluster. In some embodiments, the management service 115 can automatically modify one or more security settings 149 to cause the policy strength score of the instance to change so that it falls within a cluster. In this scenario, the management service 115 can modify a security setting 149 only so that the policy strength score improves rather than declines.

The management service 115 can also generate templates for a configuration of the security settings 149 within a particular categorization based upon the clusters. For example, the management service 115 can identify security settings 149 having the most commonality between the identified clusters and generate a security setting template that is based on the most common security settings 149 within a cluster. The templates can be provided as suggestions to an administrator who is performing initial setup of an instance of managed devices or as one or more suggestions that would improve the policy strength score of a previously configured instance of managed devices.

To generate suggested or automated actions for a given instance, the management service can identify security settings 149 in a cluster having a value that is common between instances within the cluster and rank them according to how common they are. For example, a security setting 149 common to the largest percentage of instances is the highest ranked security setting 149. The management service 115 can then identify the highest ranked security setting 149 and determine whether the value for that setting in a particular instance that falls outside of a cluster is different. If so, modifying the security setting 149 can be a suggested or automated action. The management service 115 can evaluate each of the security settings 149 against the instance according to the respective ranking of the security setting 149.

Figure 2:
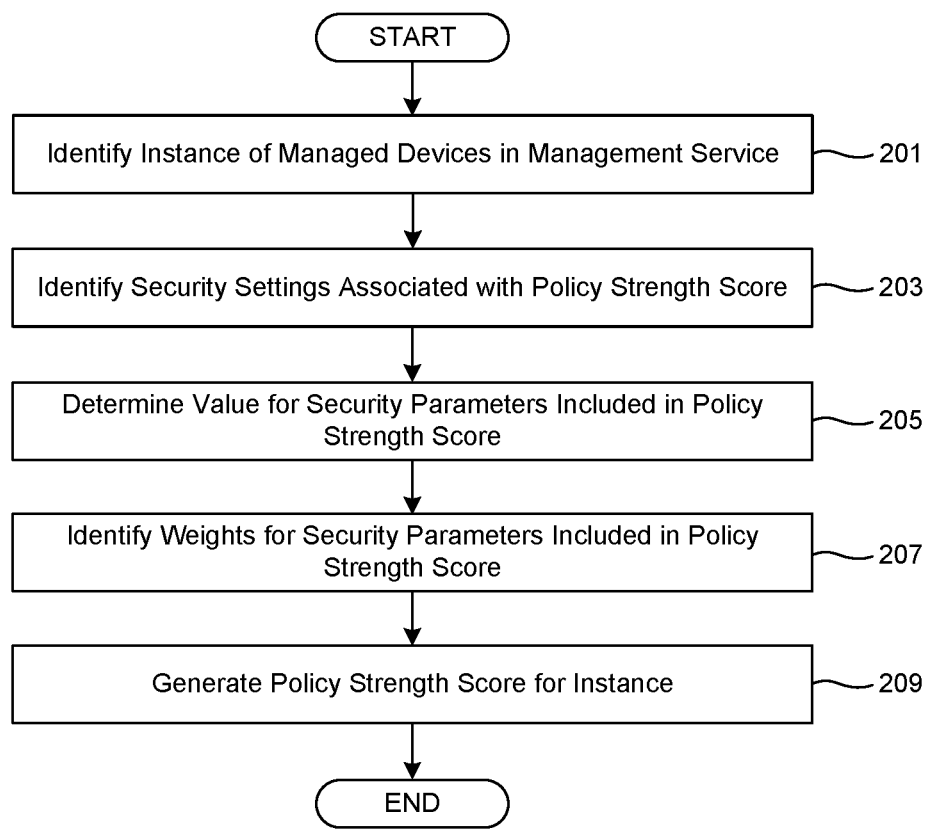
FIG. 2 is a drawing of a flowchart according to examples of the disclosure.

Referring next to FIG. 2, shown is a flowchart that provides one example of the operation of a portion of the management service 115 to generate a policy strength score for an instance of managed devices within the management service 115. The flowchart of FIG. 2 can be viewed as depicting an example of elements of a method implemented by the management service 115 or other suitable software component according to one or more examples. The separation or segmentation of functionality as discussed herein is presented for illustrative purposes only.

First, at step 201, the management service 115, or the cluster module 118 of the management service 115, can identify a particular instance of managed devices within the management service 115. The instance can be one that an administrator is attempting to configure and for which the management service 115 is generating management console user interfaces. The instance can also be one that an administrator is newly configuring or one that was previously configured. The policy strength score is generated for the instance so that the management service 115 can determine whether the instance is misconfigured or whether there are suggested actions the administrator can take with respect to security settings 149 that would improve the policy strength score.

At step 203, the management service 115 can identify the security settings 149 that are associated with calculation of the policy strength score. As noted above, the management service 115 can take into account various settings that an administrator can set up with respect to an instance of managed devices when calculating the policy strength score. In this sense, the policy strength score represents a relative security of the configuration of the instance of managed devices within the management service 115. In some embodiments, certain ones of the security settings 149 can be utilized in a policy strength score while others may not be incorporated into the score.

At step 205, the management service 115 can determine a value for the various security settings 149 that are utilized to calculate the policy strength store. In one embodiment, the value of the security settings 149 can each be normalized to a Boolean value. In other embodiments, the value of the respective security settings 149 can be scaled according to a scaling function for each of the security settings 149 that converts the value to a scaled score. For example, a scaling function for a password complexity setting can convert the value of the setting to a score on a scale between zero and ten. In this scenario, a setting defining a maximum period of time between communication with the management service 115 can be converted using a different scaling function that converts the setting to a score on a zero-to-ten scale.

At step 207, the management service 115 can then determining weighting values for each of the security settings 149 that are utilized in the policy strength score. The policy strength score can comprise a function that sums or otherwise combines the values of the security settings 149 used in the score. However, the respective security settings 149 values can also be weighted according to importance or a prominence within the policy strength score.

Accordingly, the policy strength score for a given instance of managed devices can be calculated using a formula as follows:

$$\text{Score} = W_1 * S_1 + W_2 * S_2 + \ldots + W_{21} * S_{21}$$

In the above example, $S_1$ represents the value assigned to a first security setting 149 and $W_1$ represents the weighting value that is also assigned to the security setting 149, and so on.

At step 209, once the security settings 149 for the instance of managed devices is determined and their respective values are assessed, the policy strength score for the instance can be calculated using a formula for the score. As noted above, the policy strength score can be utilized to generate clusters of instances of managed devices within a particular category of organization within the management service 115. The policy strength score can also be used to provide recommended actions that can cause the score to be improved or fall within a cluster in a given category. After step 209, the process proceeds to completion.

Figure 3:
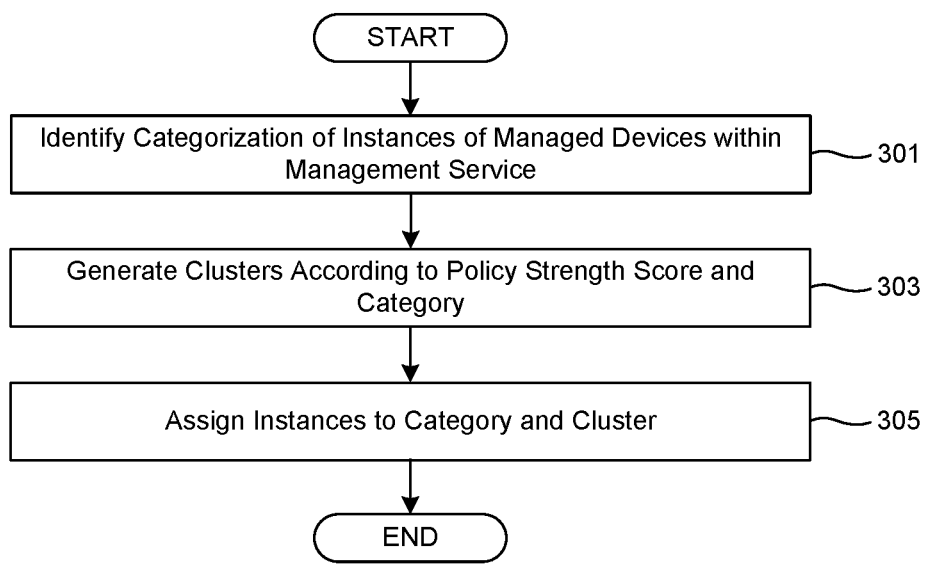
FIG. 3 is a drawing of a flowchart according to examples of the disclosure.

Referring next to FIG. 3, shown is a flowchart that provides one example of the operation of a portion of the management service 115, or the cluster module 118, to generate clusters of instances of managed devices within the management service 115. The clusters are generated to identify groupings of instances of managed devices within the management service 115. The flowchart of FIG. 2 can be viewed as depicting an example of elements of a method implemented by the management service 115 or other suitable software component according to one or more examples. The separation or segmentation of functionality as discussed herein is presented for illustrative purposes only.

First, at step 301, the management service 115 can identify a categorization of instances of managed devices within the management service 115. The identified categorization is a category of managed devices for which clusters are going to be identified by the cluster module 118. A categorization can include an industry vertical, an organization type, an organization size, or a geographic parameter. A categorization can also include a combination of a broad category and a narrower subcategory. For example, the categorization can include a combination of an industry vertical and an organization size. The cluster module 118 can identify clusters of instances of managed devices within categories so that recommended actions or automated actions that modify security settings 149 can be generated by the management service 115.

At step 303, the management service 115 can generate clusters according to the policy strength scores of the respective instances within the identified categorization. The clusters can be generated using a clustering algorithm that can identify a distribution of policy strength scores and place them into N clusters. For example, the clustering algorithm can be configured to generate N clusters for each industry for which the management service 115 has customers. The N clusters can be ranked by their mean or average policy strength scores. To be placed within a cluster, the clustering algorithm can be configured to cluster instances with a score that are within a certain range or standard deviation of one another. The clusters can provide an indication of industry best practices or at least identify instances within a categorization that are similarly grouped in terms of security settings 149.

At step 305, the management service 115 can assign the instances of managed devices within the management service 115 to the clusters. In one example, a cluster assignment can be associated with enterprise instance data 142 corresponding to the instance. The cluster assignment can identify the cluster into which the instance was placed and the corresponding categorization associated with cluster. In some cases, a particular instance can be assigned to multiple clusters. For example, a particular instance can be assigned to an industry vertical cluster, an organization size cluster, and a geographic location cluster. Thereafter, the process can proceed to completion.

Figure 4:
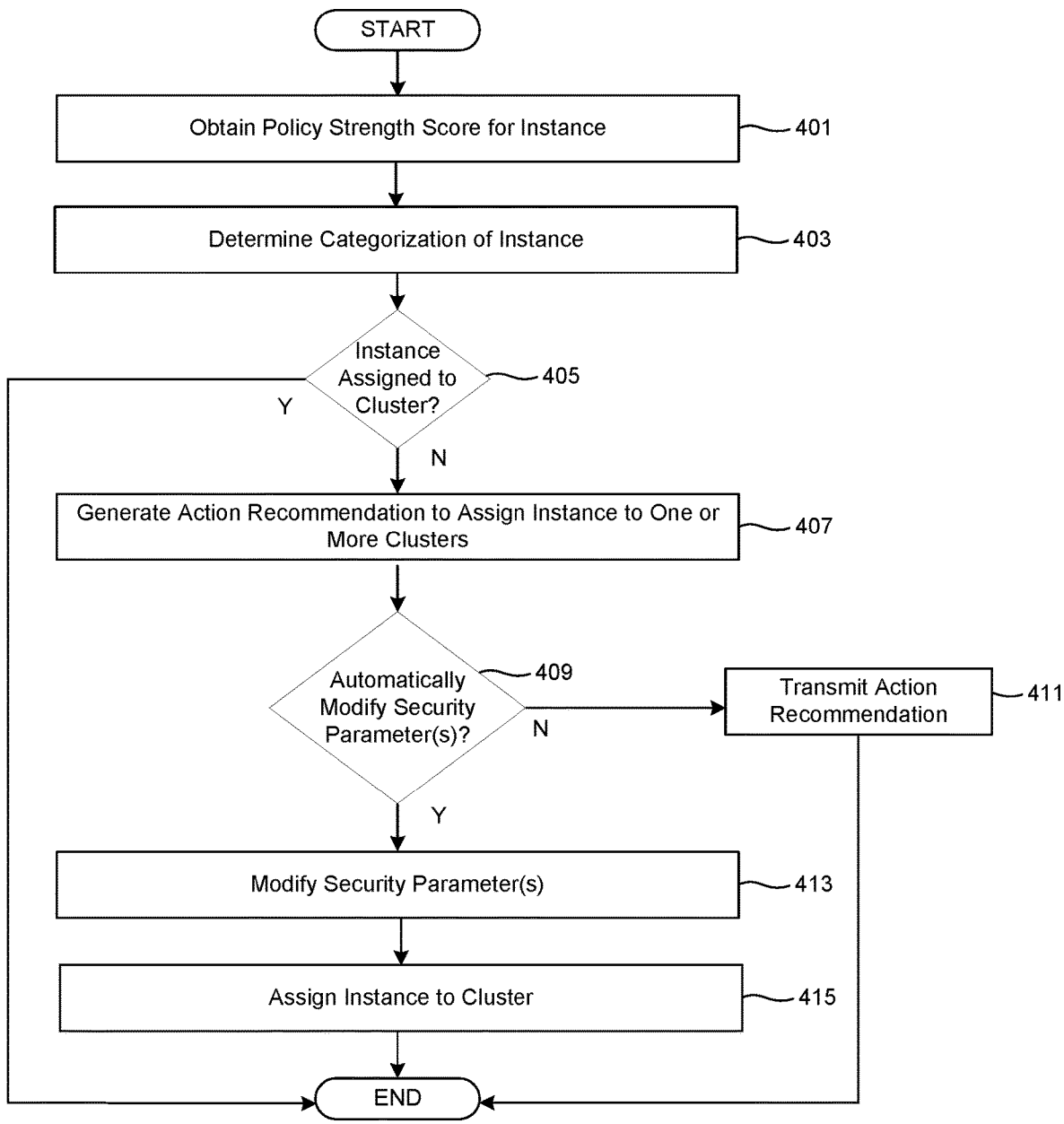
FIG. 4 is a drawing of a flowchart according to examples of the disclosure.

Referring next to FIG. 4, shown is a flowchart that provides one example of the operation of a portion of the management service 115 to generate suggested or automated actions that modify the policy strength score to place a particular instance of managed devices into a cluster. The flowchart of FIG. 4 can be viewed as depicting an example of elements of a method implemented by the management service 115 or other suitable software component according to one or more examples. The separation or segmentation of functionality as discussed herein is presented for illustrative purposes only.

The process shown in FIG. 4 can be implemented to provide an administrator with recommended actions in a management console user interface or as automated actions that the management service 115 can proactively take to improve the policy strength score of the instances of managed devices. It should be noted that the policy strength scores and the clusters of instances can vary and shift over time as administrators update the security settings 149 of their respective instances. Accordingly, the recommended or automated actions the management service 115 can take can change over time.

First, at step 401, the management service 115 can obtain a policy strength score for a particular instance of manage devices within the management service 115. The particular instance can represent an instance for which the management service 115 is generating recommended or automated actions for modifying security settings 149. The recommended or automated actions can improve the policy strength score or place the instance into a cluster.

At step 403, the management service 115 can determine the categorization of the instance. The categorization of the instance for the purpose of the process shown in FIG. 4 can be selected by an administrator as a part of a setup wizard process. The setup wizard process can be provided by management console user interfaces to provide recommendations for how the administrator can improve the security of the instance. Alternatively, the setup wizard process can provide a setup template that allows the administrator to select a particular default setup for the instance based upon a selected categorization.

At step 405, the management service 115 can determine whether instance identified in step 401 is already assigned to a cluster within the selected categorization based upon its policy strength score. To be placed within a cluster, the clustering algorithm can be configured to cluster instances with a score that are within a certain range or standard deviation of one another. If so, the process can proceed to completion, as the management service 115 can determine that because it is already assigned to a cluster, the security settings 149 of the cluster are already in line with the practices of other organizations within the same categorization. If the management service 115 is not already assigned to a cluster, the process can proceed from step 405 to step 407.

At step 407, the management service 115 can generate an action that would modify the policy strength score to cause the instance to be placed within a cluster. The management service 115 can be limited so that it only modifies or suggests modification of the security settings so that the policy strength score is increased to move a particular instance into a cluster within its category.

To generate suggested or automated actions for the instance, the management service 115 can identify security settings 149 in a cluster having a value that is common between instances within the cluster and rank them according to how common they are. For example, a security setting 149 common to the largest percentage of instances is the highest ranked security setting 149. The management service 115 can then identify the highest ranked security setting 149 and determine whether the value for that setting in a particular instance that falls outside of a cluster is different. If so, modifying the security setting 149 can be a suggested or automated action. The management service 115 can evaluate each of the security settings 149 against the instance according to the respective ranking of the security setting 149.

At step 409, the management service 115 can determine whether the security settings 149 should be automatically modified to cause the instance to be brought within a cluster. In some cases, an administrator can enable a setting associated with the instance that authorizes the management service 115 to automatically modify security settings 149 to keep the instance within a cluster. In one example, the setting can allow the administrator to identify a particular cluster, such as a low, middle, or high cluster within a particular categorization, and authorize the management service 115o to keep the instance within the identified cluster.

If, at step 409, the management service 115 determines that the administrator for the instance of managed devices has authorized automatic modification of security settings 149, the process can proceed to step 413. Otherwise, the process can proceed to step 411.

At step 411, the management service 115 can transmit to the administrator a recommendation for an action that can improve the policy strength score associated with the instance. The recommended action can include modifying one or more security settings 149 that can cause the instance to be placed within a cluster. In this scenario, the management service 115 can be limited so that it only suggests modification of security settings 149 so that the policy strength score is increased to move a particular instance into a cluster within its category. Thereafter, the process can proceed to completion.

At step 413, the management service 115 can automatically take one or more actions that can improve the policy strength score associated with the instance. The recommended action can include modifying one or more security settings 149 that can cause the instance to be placed within a cluster. In this scenario, the management service 115 can be limited so that it only suggests modification of security settings 149 so that the policy strength score is increased to move a particular instance into a cluster within its category.

At step 415, the management service 115 can assign the instance to the cluster following modification of the security settings 149 because the modification causes the policy strength score to improve such that the cluster is now placed within the cluster. Thereafter, the process proceeds to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the management service 115, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, the management component 124, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying program code executable in at least one computing device that, when executed by the at least one computing device, causes the at least one computing device to at least:

generate a policy strength score for a plurality of configuration parameters for a particular instance of managed devices within a management service;

identify a categorization of the particular instance within the management service;

identify at least one cluster of instances within the management service sharing the categorization, the at least one cluster identified based upon at least one respective policy strength score; and in response to the policy strength score for the particular instance failing to be within a respective cluster range of the at least one cluster, generate an action for the particular instance to cause the particular instance to join a particular cluster, wherein the action comprises a recommended action to identity and modify a particular security setting associated with the particular instance of managed devices, and the modification causes an adjustment to the policy strength score such that the policy strength score is within the respective cluster range of the at least one cluster.

2. The non-transitory computer-readable medium of claim 1, wherein the policy strength score is based upon a plurality of security settings that are enforced on behalf of the management service by a management component installed on a plurality of managed devices associated with the particular instance.

3. The non-transitory computer-readable medium of claim 2, wherein the plurality of security settings comprise at least one of: a network enabled setting, a compromised device setting, a content filtering setting, a data backup setting, a data loss prevention setting, a geofencing setting, a setting defining at least one approved application for opening documents, an offline access setting, an email permission setting, a clipboard permission setting, a camera permission setting, a screenshot permission setting, a user authentication type setting, a passcode type setting, a setting defining a maximum number of failed authentication attempts, a maximum passcode age setting, a setting defining a maximum period between communications with the management service, or a password complexity setting.

4. The non-transitory computer-readable medium of claim 3, wherein the policy strength score is calculated by assigning respective scores to a respective value for each of the plurality of security settings in the particular instance within the management service.

5. The non-transitory computer-readable medium of claim 4, wherein the policy strength score is calculated by assigning a respective weight to the respective scores for the respective value for each of the plurality of security settings and summing the respective scores.

6. The non-transitory computer-readable medium of claim 1, wherein the at least one cluster of instances are generated by identifying respective instances having respective policy strength scores within a respective cluster range.

7. The non-transitory computer-readable medium of claim 1, wherein the policy strength score is generated based on identifying the particular instance of managed devices within the management service from a plurality of inputs received by a management console user interface.

8. A system comprising:
at least one computing device; and
a management service executable by the at least one computing device, the management service causing the at least one computing device to at least:
generate a policy strength score for a plurality of configuration parameters for a particular instance of managed devices within a management service;
identify a categorization of the particular instance within the management service;
identify at least one cluster of instances within the management service sharing the categorization, the at least one cluster identified based upon at least one respective policy strength score; and
in response to the policy strength score for the particular instance failing to be within a respective cluster range of the at least one cluster, generate an action for the particular instance to cause the particular instance to join a particular cluster, wherein the action comprises a recommended action to identity and modify a particular security setting associated with the particular instance of managed devices, and the modification causes an adjustment to the policy strength score such that the policy strength score is within the respective cluster range of the at least one cluster.

9. The system of claim 8, wherein the policy strength score is based upon a plurality of security settings that are enforced on behalf of the management service by a management component installed on a plurality of managed devices associated with the particular instance.

10. The system of claim 9, wherein the plurality of security settings comprise at least one of: a network enabled setting, a compromised device setting, a content filtering setting, a data backup setting, a data loss prevention setting, a geofencing setting, a setting defining at least one approved application for opening documents, an offline access setting, an email permission setting, a clipboard permission setting, a camera permission setting, a screenshot permission setting, a user authentication type setting, a passcode type setting, a setting defining a maximum number of failed authentication attempts, a maximum passcode age setting, a setting defining a maximum period between communications with the management service, or a password complexity setting.

11. The system of claim 10, wherein the policy strength score is calculated by assigning respective scores to a respective value for each of the plurality of security settings in the particular instance within the management service.

12. The system of claim 10, wherein the policy strength score is calculated by assigning a respective weight to the respective scores for the respective value for each of the plurality of security settings and summing the respective scores.

13. The system of claim 8, wherein the at least one cluster of instances are generated by identifying respective instances having respective policy strength scores within a respective cluster range.

14. The system of claim 8, wherein the policy strength score is generated based on identifying the particular instance of managed devices within the management service from a plurality of inputs received by a management console user interface.

15. A method comprising:
generating a policy strength score for a plurality of configuration parameters for a particular instance of managed devices within a management service;
identifying a categorization of the particular instance within the management service;
identifying at least one cluster of instances within the management service sharing the categorization, the at least one cluster identified based upon at least one respective policy strength score; and
in response to the policy strength score for the particular instance failing to be within a respective cluster range of the at least one cluster, generating an action for the particular instance to cause the particular instance to join a particular cluster, wherein the action comprises a recommended action to identity and modify a particular security setting associated with the particular instance of managed devices, and the modification causes an adjustment to the policy strength score such that the policy strength score is within the respective cluster range of the at least one cluster.

16. The method of claim 15, wherein the policy strength score is based upon a plurality of security settings that are enforced on behalf of the management service by a management component installed on a plurality of managed devices associated with the particular instance.

17. The method of claim 16, wherein the plurality of security settings comprise at least one of: a network enabled setting, a compromised device setting, a content filtering setting, a data backup setting, a data loss prevention setting, a geofencing setting, a setting defining at least one approved application for opening documents, an offline access setting, an email permission setting, a clipboard permission setting, a camera permission setting, a screenshot permission setting, a user authentication type setting, a passcode type setting, a setting defining a maximum number of failed authentication attempts, a maximum passcode age setting, a setting defining a maximum period between communications with the management service, or a password complexity setting.

18. The method of claim 17, wherein the policy strength score is calculated by assigning respective scores to a respective value for each of the plurality of security settings in the particular instance within the management service.

19. The method of claim 17, wherein the policy strength score is calculated by assigning a respective weight to the respective scores for the respective value for each of the plurality of security settings and summing the respective scores.

20. The method of claim 15, wherein the at least one cluster of instances are generated by identifying respective instances having respective policy strength scores within a respective cluster range.

\* \* \* \* \*